Patented Sept. 18, 1951

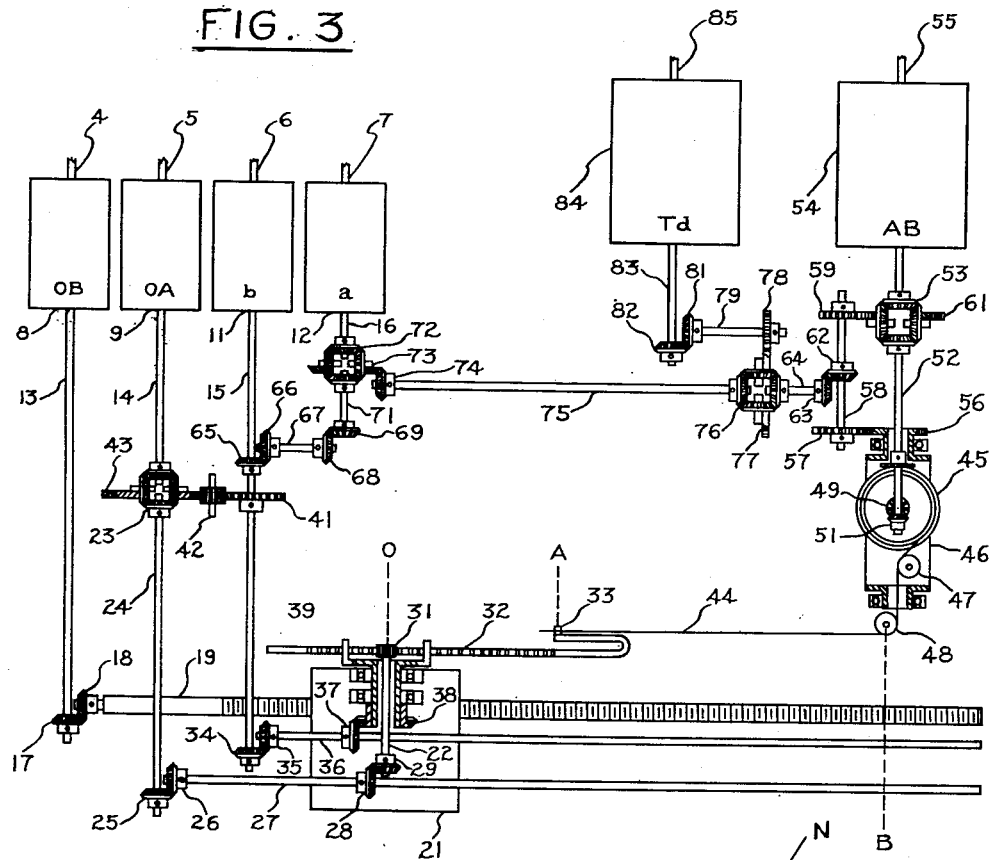

2,567,984

UNITED STATES PATENT OFFICE 2,567,984

APPARATUS FOR SHIPBOARD WIND MEASUREMENT

Louvan E. Wood, Glen Arm, Md., assignor to Bendix Aviation Corporation, Baltimore, Md., a corporation of Delaware Application August 10, 1949, Serial No. 109,518

7 Claims. (Cl. 235—61)

This invention relates generally to apparatus for measuring the magnitude and direction of wind and particularly to an apparatus of the type suitable for use aboard ships travelling at sea.

The measurement of the magnitude and direction of the wind, when taken aboard ships at sea, has always been a problem in view of the fact that the effect of the ship's motion is to produce an apparent wind equal in magnitude to the ship's speed and coming from the direction in which the ship is heading. Conventional wind measuring equipment will respond to the apparent wind but will not give an indication of the true wind conditions.

Accordingly, it is an object of the present invention to provide apparatus to be used aboard ships for the purpose of indicating the true wind conditions when the ship is in motion at sea.

To achieve the above object, it is necessary to provide means for solving a vector triangle. The ship's vector (ship's speed and direction with respect to the earth's surface) adds to the true wind vector (wind speed and direction with respect to the earth's surface) to give the apparent wind vector (wind speed and direction with respect to the ship). The unknown vector in the aforesaid vector triangle is the true wind vector which must be determined by subtracting the ship's vector from the apparent wind vector.

The ship's direction may be taken from a compass repeater or other suitable instrument and the ship's speed may be taken from appropriate instruments. The direction is measured clockwise from the north. The apparent wind speed and direction are determined from an anemometer and wind vane on the ship. The direction of the wind is measured clockwise from the longitudinal axis of the ship. The ship's speed and direction and the apparent wind speed and direction are thus readily determined by conventional equipment and it is these factors to which the apparatus of the present invention responds in a manner to give the true wind speed and direction.

A further object of the invention is to provide apparatus for determining the magnitude and direction of a vector which is the resultant of two vectors, each varying with respect to magnitude and direction.

The above objects are carried out by means of the apparatus to be described below, taken in conjunction with the drawings.

In the drawings:

Figure 1 illustrates the vector triangle to be solved.

Figure 2 is the vector triangle shown in Figure 1, in which the triangle has been rotated to bring one of the vectors in the horizontal coordinate.

Figure 3 is a schematic diagram of the apparatus to be used for solving the vector triangles shown in Figures 1 and 2.

Referring to Figure 1, the various speeds and directions with which the present invention is concerned are shown graphically therein.

In Figure 1, the following legend will serve to describe the vectors shown:

"OA" is the ship's vector, the length of the vector representing the speed of the ship, expressed in any conventional manner such as knots per hour.

"$a$" represents the ship's direction and, in Figure 1, we see that the ship in the example shown is heading slightly northeast.

"OB" is the vector for apparent wind speed and direction, the length of OB indicating the apparent wind speed and can be expressed in any convenient manner such as knots per hour.

"$b$" is the apparent wind direction taken with respect to the longitudinal axis of the ship.

"AB" is the vector for true wind speed and direction, the length of AB representing the magnitude of the true wind speed.

"T$d$" is the angle showing true wind direction, which is always measured clockwise from the north.

Referring to Figure 1, it is seen that the vector AB, if extended, will intersect the $y$ axis at the point of C. Thus, in the triangle OBC we have the following relationship: $a$ plus $b$ plus $c$ plus (180° minus T$d$) equals 180°. From this it follows that T$d$ = $a$ plus $b$ plus $c$.

Therefore, in order to determine true wind direction, we must determine the angle $c$ and add it to the angles $a$ and $b$ which are known. To determine true wind speed, it is necessary to determine the length of AB.

To solve the problem mechanically, it is convenient if $a$, $b$, OA, and OB can be expressed as angular positions of shafts or rates of rotations of shafts. The angle $a$ and the length OA may be obtained from the ship's instruments and the angle $b$ and the length OB may be obtained from a suitable wind system employing synchronous motors. In the following description it is assumed that $a$, $b$, OA and OB are available as angular positions of shafts.

Whereas it would be possible to construct a mechanical vector triangle in such a way that all three vectors would move with respect to a fixed base or reference plane, it is felt that such a mechanism would be unnecessarily complicated. In the apparatus described below, it is proposed to anchor or fix the vector OB in so far as its direction is concerned, and let the other two vectorys, OA and AB, move with respect to OB. Figure 2 shows the vector triangle in which OB is fixed with respect to direction.

Referring to Figure 2, it is apparent that a mechanical vector triangle may be constructed in which OB is fixed with respect to direction. In the apparatus for carrying out the solution of the vector triangle shown in Figure 2, it is provided that the vector OB can be laid off mechanically to represent an apparent wind speed up to 100 knots per hour. The vector OA can be laid off mechanically to represent ship's speed up to its maximum. The vectors OA and OB are separated by the angle $b$. The vector AB is determined by the relative positions of vectors OA and OB.

Figure 3 illustrates schematically one form of apparatus which can be used to mechanically solve the vector triangle shown in Figure 2. As mentioned above, the speed and direction of the ship and the apparent wind are converted into angular positions of shafts. This can be done by conventional means and forms no part of the present invention and, for simplicity, is not shown herein. Thus, for a manually operated device, the readings of the ship's instruments could be noted and the indicated readings could be manually converted into angular positions of shafts, or, for automatic operation, the ship's instruments could be arranged in combination with synchronous motors whereby the indicated readings would be automatically and mechanically converted into angular positions of shafts or rates of rotations of shafts. In the example shown in Figure 3, fully automatic operation is provided for.

The shafts 4, 5, 6 and 7 represent the input from the apparent wind speed sensing unit, the ship's speed sensing unit, the apparent wind direction sensing unit and the ship's direction sensing unit, respectively. The conventional equipment used to translate the magnitude and direction of the ship's speed and the apparent wind speed into angular positions of shafts ordinarily does not possess sufficient power to provide a working degree of torque for the shafts 4, 5, 6 and 7. For this reason, there are shown at 8, 9, 11 and 12, four torque amplifiers, coupled to the shafts 4, 5, 6 and 7, respectively. There torque amplifiers provide sufficient torque on their output side to actuate the mechanism for solving the vector triangle. One form of torque amplifier that could be used in this instance is that shown in U. S. Patent No. 2,407,200, issued September 3, 1946, in the name of Louvan E. Wood. Other forms of torque amplifiers could be used and the one shown in Patent 2,407,200 is included herein merely for purposes of illustration. Each of the torque amplifiers 8, 9, 11 and 12 have output shafts 13, 14, 15 and 16, respectively.

To lay off the vector OB, the torque amplifier 8 will rotate its output shaft 13 in proportion to the magnitude of the wind speed. Secured to shaft 13 is a bevel gear 17 which drives a bevel gear 18 to which is secured screw 19. As the gear 18 rotates in response to rotation of gear 17, the screw 19 will rotate in a proportionate amount and serve to position carriage 21 at a distance from the axis B corresponding to the length of vector OB.

To lay off the length of the vector OA, torque amplifier 9 drives the output shaft 14 through a differential mechanism 23, having an output shaft 24 and a bevel gear 25 secured to the shaft 24. Bevel gear 25 drives bevel gear 26, which, in turn, rotates spline shaft 27 in an amount proportional to the magnitude of the ship's speed. Rotation of spline shaft 27 serves to rotate bevel gear 28, which, in turn, rotates bevel gear 29 secured to shaft 22. Rotation of the gear 29 causes rotation of pinion 31 secured to the other end of shaft 22, and this, in turn, will cause the rack 32 to be positioned in accordance with the magnitude of ship's speed.

It is to be noted that the axes B, O, and A are mutually parallel, the axis B being fixed and the axes O and A being free to move with respect to axis B. The axis O is located by pinion 31 and passes through the point of engagement of pinion 31 and rack 32. The center line of a stud 33, fixed to the end of rack 32, determines the axis A.

To determine the angle $b$, which is the angle of separation of the vectors OA and OB, the torque amplifier 11 rotates its output shaft 15, to which is secured bevel gear 34. Rotation of bevel gear 34 causes a bevel gear 35 to rotate, which, in turn, rotates spline shaft 36 and bevel gear 37 attached to shaft 36. Gear 37 causes bevel gear 38 to rotate, which, in turn, serves to rotate yoke 39 to which gear 38 is secured. The yoke 39 is journaled for rotation in the carriage 21 and serves to move the rack 32 through an angular movement corresponding to the apparent wind direction.

It is to be noted that if the yoke 39 is rotated and the pinion 31 were to remain stationary during this rotation, the rack 32 would be caused to move and thus change the distance OA, thereby introducing an error into the apparatus. To compensate for this error and provide means whereby the length OA does not vary because of rotation of yoke 39, the shaft 15 has secured to it gear 41 which rotates with the shaft 15 and serves to rotate idler gear 42. Rotation of the idler gear 42 rotates gear 43, which is secured to the cage of differential 23. Thus, it is seen that the differential 23 will rotate the shaft 24 in an amount proportional to the rotation of shaft 15 and in the opposite direction. This rotation of shaft 24, caused by shaft 15, is translated to the pinion 31, causing it to rotate an amount proportionate to the rotation of yoke 39, thereby compensating for any changes in the length OA caused by rotation of yoke 39.

It is evident that the mechanism so far described illustrates how the vector OB and OA can be laid off mechanically and so positioned whereby they are separated by the angle $b$.

To complete the solution of the mechanical vector triangle, there is provided a flexible member 44 affixed at one end to the stud 33 carried by rack 32; the other end of member 44 being affixed to a rotating member 45. Member 45 is journaled for rotation in a swivel carriage 46. Suitable take-up springs can be provided for member 44 whereby it is maintained under tension during the operation of the apparatus. The member 44 is guided by rollers 47 and 48. These rollers may be journaled in the swivel carriage 46. Thus, it is seen that as the stud 33 moves, the flexible member 44 is correspondingly moved, and the length of the vector AB is established by the positioning of the member 44. Member 44 will serve to rotate the swivel carriage 46 in an amount proportional to the angle $c$. Affixed to the rotating member 45 is a gear 49 which drives a gear 51 secured to one end of shaft 52. Shaft 52 drives through a differential 53 and the output rotation of shaft 52 is delivered into a torque amplifier 54 which, in turn, has an output shaft 55 which may be coupled to suitable indicating apparatus for showing the magnitude of the true wind speed. The torque amplifier 54 can be of the same type as the torque amplifiers 8, 9, 11 and 12.

Swivel carriage 46 has secured to it the gear 56 which rotates therewith and serves to drive gear 57, secured to one end of shaft 58. It is evident that the rotation of swivel carriage 46 about the axis B will serve to rotate shaft 52 and thus introduce an error into the system which would give a faulty indication of the magnitude of the true wind speed. To compensate for this error, a gear 59 is secured to shaft 58 and this gear, in turn, drives a gear 61 secured to the cage of differential 53. Therefore, rotation of the swivel carriage 46 will cause the gear 61 to rotate and the differential 53 will function to compensate for any errors introduced into the system by virtue of the rotation of the swivel carriage 46.

To derive an output rotation corresponding to the angle $c$, gear 62 is coupled to shaft 58 and this gear, in turn, drives gear 63 coupled to shaft 64.

Bearing in mind that the true wind direction is expressed as the sum of the angles $a$, $b$, and $c$, the mechanism for deriving this sum will now be explained. The angle $b$ is determined by the rotation of shaft 15. This shaft, in turn, rotates gear 65 and this gear will rotate gear 66 secured to shaft 67. Rotation of shaft 67 will cause gear 68 to rotate, which in turn causes rotation of gear 69. Gear 69 is secured to shaft 71, which, in turn, is coupled to one side of differential 72. Shaft 16 is coupled to the other side of differential 72 and thus we see angular rotations delivered to opposite sides of the differential 72 corresponding to the angles $a$ and $b$. The sum of the angles $a$ and $b$ is derived by the rotation of gear 73 affixed to the cage of differential 72. This gear drives gear 74, which, in turn, drives shaft 75. Shaft 75 is coupled to one side of differential 76, the other side of which is coupled to shaft 64. Thus, we have a rotational movement delivered to one side of differential 76, proportional to the sum of the angles $a$ and $b$, and there is a rotational movement delivered to the other side of differential 76 proportional to the angle $c$. The sum of the angles $a$, $b$ and $c$ is derived by the rotation of gear 77 affixed to the cage of differential 76. Rotation of gear 77 causes rotation of gear 78, which, in turn, drives shaft 83. Shaft 83 will rotate in an amount proportional to the sum of angles $a$, $b$ and $c$. The rotational movement of shaft 83 is delivered to a torque amplifier 84 to which is coupled an output shaft 85, which, in turn, may be coupled to conventional indicating equipment for showing the true wind direction. Torque amplifier 84 can be of the same type used for the torque amplifiers 8, 9, 11 and 12.

The operation of the apparatus may be summarized as follows:

Carriage 21 is positioned along the screw 19 to lay off OB at a distance from the axis B corresponding to the magnitude of apparent wind speed. The rack 32 is positioned with respect to the carriage 21, whereby the magnitude and direction of the vector OA is mechanically reproduced. As the axis A on rack 32 moves, the flexible member 44 will correspondingly move. A movement of member 44 will mechanically reproduce the magnitude of the vector AB and the angle $c$. The magnitude of the vector AB is converted into an output indication and the direction of vector AB is also converted into an output indication, both of which are represented as angular positions of shafts. The magnitude of the true wind speed is determined by the translation of the output angular position of shaft 52 into a conventional indicating device by means of differential 53, torque amplifier 54 and the shaft 55.

The output angular position of shaft 58 is proportional to the angle $c$ and this shaft movement is added to the movement of shafts 15 and 16 through suitable gearing and differentials to produce a rotation of shaft 83 proportional to the sum of the angles $a$, $b$ and $c$ and rotation of shaft 83 is translated into an indication of the true wind direction, $Td$, by means of torque amplifier 84, shaft 85 and any conventional indicating means.

It is to be noted that for the example shown in Figures 1 and 2, the true wind direction is determined by the sum of the angles $a$, $b$, and $c$. However, it is to be recognized that for different conditions of wind, together with different positions of a ship, the angle $c$ formed by rotation of swivel carriage 46 can have a negative, as well as a positive, sense of a direction in which case the true wind direction will be represented by the equation: $Td$ equals $a$ plus $b$ plus (minus $c$) or $a$ plus $b$ minus $c$. To further elaborate, the shaft 75 always rotates in one direction, whereas the shaft 64 can rotate in either direction, depending upon the sense of direction of angle $c$, be it positive or negative.

In the claims, it is to be understood that the use of the term "add" with reference to the combining of the output rotations of shafts 75 and 64 is to be taken as meaning an algebraic addition, with proper allowance being taken for sense of rotation of shaft 64, as described in the preceding paragraph.

What is claimed and desired to be secured by United States Letters Patent is:

1. In an apparatus for mechanically solving a vector triangle, a first means for locating a first fixed axis, a second means for locating a second axis, and a third means for locating a third axis, all of said axes being parallel; means for positioning said second means along a predetermined direction from said first means to locate said second axis from said first axis to reproduce a first leg of the triangle, means for positioning said third means from said second means to locate said third axis from said second axis at a controllable angle with respect to said predetermined direction to reproduce a second leg of said triangle; flexible means extending between said first and third means and adapted to be positioned in response to movement of said third means to reproduce the third leg of the triangle; means actuated by said flexible means to give a first output indication corresponding to the length of said third leg; and means actuated by said flexible means for giving a second output indication corresponding to the angle between said first and third legs.

2. Vector combining apparatus comprising a first means locating a first axis, a second means locating a second axis, and a third means locating a third axis, said axes being parallel and said first axis being fixed; means for moving said second means with respect to said first means for locating said second axis at a distance from said first axis corresponding to a first magnitude and along a predetermined direction; means for moving said third means with respect to said second means for locating said third axis at a distance from said second axis corresponding to a second magnitude and along a direction forming a first angle with said predetermined direction, said third axis being at a distance from said first axis and at a direction therefrom forming a second angle with said predetermined direction, said first angle corresponding to a first angular quantity; means for transferring the distance between said first and third axes into a first output indication; means for transferring said second angle into a second output indication; means for producing a third output indication corresponding to said first angular quantity and a second angular quantity; and means for adding said third output indication to said second output indication.

3. Apparatus for determining the magnitude and direction of a vector which is the resultant of two variable vectors each varying with respect to magnitude and direction, comprising a first member extending from a first axis in a predetermined direction; means for positioning a second member along said first member to locate a second axis at a distance from said first axis corresponding to the magnitude of one of said variable vectors, a third member carried by said second member and moveable with respect thereto to locate a third axis said first axis being fixed and said first, second and third axes being parallel; means for moving said third member whereby the said third axis is located at a distance from said second axis corresponding to the magnitude of the other of said variable vectors; means for positioning said third member at an angle to said first member corresponding to the angle formed by the intersection of said variable vectors, a fourth member actuated by said third member and adapted to extend between said first and third axes whereby the magnitude and direction of the resultant of said variable vectors is determined; means actuated by said fourth member to give a first and second output indication corresponding to magnitude and direction, respectively; means for producing a third output indication corresponding to the sum of the angle of direction of one of said variable vectors and the angle between said variable vectors; and means for adding said third output indication to said second output indication.

4. In combination; a first member rotatable about a first axis, a pinion; means for positioning said pinion along a predetermined direction from said first axis, said pinion serving to locate a second axis parallel to said first axis, a rack engaging said pinion, said rack having an extremity defining a third axis parallel to said first first axis; means for rotating said pinion to move said rack and position said third axis from said second axis; means for rotating said rack about said second axis to form a first angle between said rack and said predetermined direction, a flexible member carried by said first member and affixed to said rack at said extremity, said rack serving to position said flexible member at a second angle with respect to said predetermined direction whereby said first member is rotated through said second angle, said flexible member being adapted to define a distance between said first and third axes; means responsive to the rotation of said first member to give a first output indication; means actuated by said flexible member to give a second output indication corresponding to the distance between said first and third axes.

5. In combination; a first member rotatable about a first axis, a pinion; means for positioning said pinion along a predetermined direction from said first axis, said pinion serving to locate a second axis parallel to said first axis, a rack engaging said pinion, said rack having an extremity defining a third axis parallel to said first axis; means for rotating said pinion to move said rack and position said third axis from said second axis; means for rotating said rack about said second axis to form a first angle between said rack and said predetermined direction, a flexible member carried by said first member and affixed to said rack at said extremity, said rack serving to position said flexible member at a second angle with respect to said predetermined direction whereby said first member is rotated through said second angle, said flexible member being adapted to define a distance between said first and third axes; means responsive to the rotation of said first member to give a first output indication; means actuated by said flexible member to give a second output indication corresponding to the distance between said first and third axes, a second and a third member adapted to rotate; means responsive to the joint rotation of said second and third members to give a third output indication; means responsive to said first and third output indications for giving a fourth output indication.

6. In apparatus for indicating the true speed and direction of wind aboard moving ships at sea; in combination, first, second, third and fourth shafts adapted to rotate in response to apparent wind speed, ship speed, apparent wind direction, and ship direction, respectively; a first member rotatable about a first axis, a pinion; means actuated by said first shaft for positioning said pinion along a predetermined direction from said first axis, said pinion serving to locate a second axis parallel to said first axis, a rack engaging said pinion, said rack having an extremity defining a third axis parallel to said first axis; means actuated by said second shaft for rotating said pinion to move said rack and position said third axis from said second axis; means actuated by said third shaft for rotating said rack about said second axis to form a first angle between said rack and said predetermined direction, a flexible member carried by said first member and affixed to said rack at said extremity, said rack serving to position said flexible member at a second angle with respect to said predetermined direction whereby said first member is rotated through said second angle; said flexible member being adapted to define a distance between said first and third axes corresponding to true wind speed; means actuated by said flexible member to give a first output indication corresponding to the distance between said first and third axes; means responsive to the rotation of said first member to give a second output indication; means responsive to the rotation of said third and said fourth shafts to give a third output indication; and means jointly responsive to the said second and said third output indications to give a fourth output indication corresponding to true wind direction.

7. In apparatus for use aboard ships moving at sea for determining the speed and direction of the wind, the combination of a first, a second, a third, and a fourth shaft, each adapted to rotate in response to the apparent wind speed, ship speed, apparent wind direction, and ship direction, respectively; a first member rotated by said first shaft; a second member positioned by said first member at a distance from a first axis corresponding to apparent wind speed; said second member serving to locate a second axis parallel to said first axis; a third member rotatable about said second axis and carried by said second member and serving to locate a third axis parallel to said first axis, said second shaft positioning said third member whereby the distance between said second and third axes corresponds to ship speed; said third shaft rotating said third member about said second axis to form an angle between said first and third members corresponding to apparent wind direction; a fourth member adapted for rotation about said first axis; a flexible member carried by said fourth member extending from a point on said fourth member lying in said first axis and affixed to said third member at a point thereon lying in said third axis; said third member moving said flexible member to define a distance between said third and first axes corresponding to true wind speed and to position said flexible member with respect to said first member to form a first angle therewith; means actuated by said flexible member to produce a first output indication corresponding to true wind speed; means including said fourth member actuated by said flexible member to produce a second output indication corresponding to said first angle; means responsive to said third and fourth shafts to produce a third output indication corresponding to the sum of apparent wind direction and ship's direction, means responsive to the said sum of said second and third output indications to produce a fourth output indication corresponding to true wind direction.

LOUVAN E. WOOD.

No references cited.